(12) United States Patent
Balmakhtar et al.

(10) Patent No.: US 12,136,092 B1
(45) Date of Patent: Nov. 5, 2024

(54) SECURE MANAGEMENT OF EXECUTION OF AN APPLICATION

(71) Applicant: T-Mobile Innovations LLC, Overland Park, KS (US)

(72) Inventors: Marouane Balmakhtar, Fairfax, VA (US); Galip Murat Karabulut, Vienna, VA (US); Lyle W. Paczkowski, Mission Hills, KS (US)

(73) Assignee: T-Mobile Innovations LLC

( * ) Notice: Subject to any disclaimer, the term of this patent is extended or adjusted under 35 U.S.C. 154(b) by 0 days.

(21) Appl. No.: 18/302,591

(22) Filed: Apr. 18, 2023

(51) Int. Cl.
*G06Q 20/00* (2012.01)
*G06F 9/54* (2006.01)
*G06Q 20/40* (2012.01)

(52) U.S. Cl.
CPC ......... *G06Q 20/4014* (2013.01); *G06F 9/547* (2013.01)

(58) Field of Classification Search
CPC ..... G06Q 20/40; G06Q 20/4014; G06F 9/547
USPC .................................................. 705/4, 35–45
See application file for complete search history.

(56) References Cited

U.S. PATENT DOCUMENTS

| | | | |
|---|---|---|---|
| 9,282,898 B2 | 3/2016 | McRoberts et al. | |
| 9,801,056 B1 * | 10/2017 | Parsel ..................... | H04W 4/70 |
| 2017/0201850 A1 * | 7/2017 | Raleigh .................. | G06Q 30/02 |
| 2018/0025442 A1 * | 1/2018 | Isaacson .............. | G06Q 20/065 |
| | | | 705/26.62 |
| 2019/0121613 A1 * | 4/2019 | Chang ................ | G06Q 20/4012 |
| 2020/0045519 A1 * | 2/2020 | Raleigh .................. | G06Q 30/02 |
| 2020/0111102 A1 * | 4/2020 | Vukich .............. | G06Q 20/4018 |
| 2020/0133744 A1 * | 4/2020 | MacLeod ................ | G06F 9/541 |
| 2020/0226002 A1 * | 7/2020 | MacLeod .................. | G06F 9/54 |
| 2021/0174914 A1 * | 6/2021 | Cano ....................... | G06Q 50/22 |
| 2022/0138705 A1 * | 5/2022 | Wright ................... | G06Q 20/40 |
| | | | 705/39 |
| 2022/0222431 A1 * | 7/2022 | Zionpour ............. | G06Q 10/103 |

\* cited by examiner

*Primary Examiner* — Cho Kwong
*Assistant Examiner* — Mohammed H Mustafa

(57) ABSTRACT

A method of managing execution of a secure application is disclosed. The method comprises receiving an initial profile of an wireless communication device (WCD) by a secure application manager executing on a computer system, storing the initial profile by the secure application manager in a datastore; receiving a request comprising a current profile of the WCD by the secure application manager from an API of a secure application executing on the WCD to invoke an operation of a secure application; comparing the current profile of the WCD by the secure application manager to the initial profile of the WCD stored in the immutable record in the datastore; and in response to determining that the current profile of the WCD matches the initial profile of the WCD, passing the request to invoke an operation of the secure application by the secure application manager to the secure application for execution.

20 Claims, 5 Drawing Sheets

SECURE MANAGEMENT OF EXECUTION OF AN APPLICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Enterprise applications may execute on servers in a private network or in a cloud computing environment. The enterprise applications may extend application programming interfaces (APIs) to devices that desire to invoke services provided by the enterprise applications. Some of the enterprise applications may involve sensitive and/or confidential transactions that are desirably secured from fraud and/or cyber attacks. Such enterprise applications may be viewed as distributed applications as part of their instructions execute on one or more servers in a private network or in a cloud computing environment while another part of their instructions may execute on other devices (user equipment and/or Internet of Things (IoT) devices) outside of the private network and/or cloud computing environment.

SUMMARY

In an embodiment, a method of managing execution of a secure payment application is disclosed. The method comprises transmitting an API of a secure payment application by a secure application manager executing on a computer to a wireless communication device, wherein the API of the secure payment application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager. The method further comprises receiving the initial profile by the secure application manager from the API of the secure payment application on the wireless communication device; storing the initial profile by the secure application manager as an immutable record in a datastore; and receiving a request by the secure application manager from the API of the secure payment application on the wireless communication device to invoke an operation of a secure payment application executing on a computer, wherein the request comprises a current profile of the wireless communication device generated by a portion of the API of the secure payment application executing in a trusted area of the wireless communication device. The method further comprises comparing the current profile of the wireless communication device by the secure application manager to the initial profile of the wireless communication device stored in the immutable record in the datastore; in response to determining that the current profile of the wireless communication device matches the initial profile of the wireless communication device, passing the request to invoke an operation of the secure payment application by the secure application manager to the secure application for execution; and receiving a request by the secure application manager from a current owner of the wireless communication device to transfer ownership of the wireless communication device to a different owner. The method further comprises authenticating the current owner by the secure application manager; in response to authenticating the current owner, commanding the wireless communication device by the secure application manager to rebuild an initial profile of the wireless communication device including an identity of the different owner; receiving an updated initial profile of the wireless communication device by the secure application manager; and storing the updated initial profile of the wireless communication device by the secure application manager as an immutable record in the datastore.

In another embodiment, a secure application management system is disclosed. The system comprises an at least one processor; a non-transitory memory; a datastore; a secure application stored in the non-transitory memory that, when executed by the at least one processor, executes requests from application programming interfaces (APIs) of the secure application installed on a plurality of wireless communication devices; and a secure application manager stored in the non-transitory memory. When executed by the at least one processor, the secure application manager transmits the API of the secure application to a wireless communication device, wherein the API of the secure application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager. The secure application manager also receives the initial profile from the API of the secure application on the wireless communication device, stores the initial profile as an immutable record in the datastore, and receives a request from the API of the secure application on the wireless communication device to invoke an operation of the secure application, wherein the request comprises a current profile of the wireless communication device generated by a portion of the API of the secure application executing in a trusted area of the wireless communication device. The secure application manager also compares the current profile of the wireless communication device to the initial profile of the wireless communication device stored in the immutable record in the datastore and, in response to determining that the current profile of the wireless communication device matches the initial profile of the wireless communication device, passes the request to invoke an operation of the secure application to the secure application for execution.

In yet another embodiment, a method of managing execution of a secure application is disclosed. The method comprises transmitting an API of a secure application by a secure application manager executing on a computer to a wireless communication device, wherein the API of the secure application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager. The method further comprises receiving the initial profile by the secure application manager from the API of the secure application on the wireless communication device; storing the initial profile by the secure application manager as an immutable record in a datastore; and receiving a request by the secure application manager from the API of the secure application on the wireless communication device to invoke an operation of a secure application executing on a computer, wherein the request comprises a current profile of the wireless communication device generated by a portion of the API of the secure application executing in a trusted area of the wireless communication device. The method further comprises comparing the current profile of the wireless communication device by the secure application manager to the initial profile of the wireless communication device stored in the immutable record in the datastore and, in response to determining that the current profile of the wireless communication device matches the initial profile of the wireless communication device, passing the request to invoke an operation of the secure application by the secure application manager to the secure application for execution.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
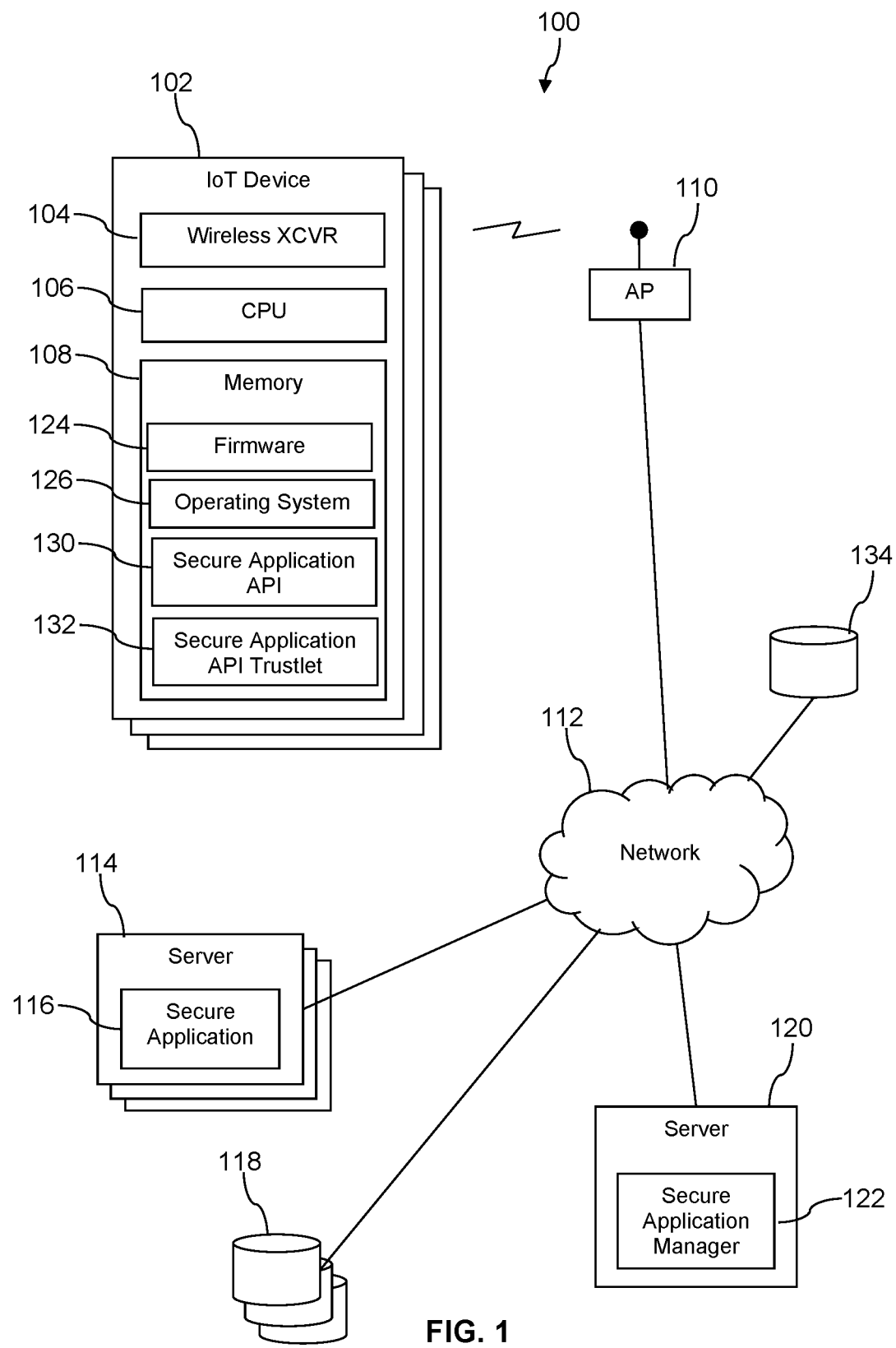
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, an application programming interface (API) of a secure application performs security support operations on a user device such as a mobile phone, a laptop computer, a notebook computer, a tablet computer, a wearable computer, a robot, an in-vehicle computer, or an Internet of things (IOT) device. The secure application may be hosted by an enterprise and may be a banking application, a payment application, an investment management application, a retirement funds management application, a retail application, a healthcare management application, or other confidential application. The secure application may provide confidential services for user devices that have installed the API of the secure application. In the context of this patent application, the term 'secure application' simply means an application that provides sensitive services or confidential services on behalf of users, where these services are desirably secure and safe against cyber attacks by malefactors.

Some secure applications may be deployed as distributed secure applications, meaning the secure application may use the principles of edge computing to enhance a user experience, to reduce a traffic load on a communication network, and to increase security of the secure application by reducing an exposure of the user-to-secure application communication. In this edge computing implementation, users may interact with instances of the secure application executing on server computers that are physically proximate to their location. To support this edge computing implementation, an enterprise may locate a plurality of server computers at different places in the United States, and secure application APIs executing on user devices may preferably interact with the closest one of the plurality of server computers.

When the API of the secure application is initially downloaded and installed on the user device, the API performs a survey of the user device, capturing information about the user device. This information can include an identity, such as a serial number, a maker, and/or model of the user device; information about firmware installed in the user device such as the size of the firmware, a firmware version, and a range of addresses where the firmware is installed in a non-transitory memory of the user device; information about the operating system artifacts installed in the user device such as the size of the operating system, the version of the operating system, and a range of addresses where the operating system artifacts are installed in the non-transitory memory of the user device; information about the API, for example a size of the API, a version of the API, and a range or addresses where the API is installed in the non-transitory memory. In an embodiment, the information can include a hash of the firmware, a hash of the operating system artifacts, and/or a hash of the API. The API collects this survey information and sends it back to a secure application manager which stores this survey information in an immutable record in a data store. In an embodiment, the survey information may be stored in a blockchain data structure in the data store. In an embodiment, the survey information may be stored in a distributed ledger data structure in the data store. It is thought that entries in a blockchain or a distributed ledger data structure are reasonably immutable, because any changes to the stored information is readily detected.

In an embodiment, the secure application manager validates the survey information against authoritative information that is provisioned into the data store by trusted partners, for example by original equipment manufacturers (OEMs) of user devices and by enterprises providing secure applications. If the survey information does not match to associated authoritative information retrieved by the secure application manager from the data store, the survey information is not stored in the data store and the API installed on the user device is not operable. The user may need to work with the enterprise providing the secure application to resolve this problem and/or attempt to reinstall the API of the secure application. In some contexts herein, the survey information may be referred to as an initial profile of the user device.

Later, when the API of the secure application requests a service of the secure application, the secure application and/or the secure application manager can command the API to again survey the user device and send the survey data to the secure application manager. The secure application manager can compare the newly captured survey data to the initial survey data stored in the data store. If the two sets of survey data match, it can be assumed that none of the API, the firmware, or the operating system of the user device have been hacked or corrupted, and the secure application can complete the service request invoked via the API by the user device. On the other hand, if the two sets of survey data do not match or do not match closely, the secure application manager can reject the service request and discontinue further communication with the subject user device, on the assumption the user device has been hacked or otherwise corrupted.

In an embodiment, the secure application manager may challenge the user device to return a current set of survey data before responding to every service request from the API. In another embodiment, the secure application manager may challenge the user device to return a current set of survey data before responding to every second service request, every third service request, every fourth service request, every fifth service request, or some other number of service requests less than twenty service requests. In an embodiment, the secure application manager may challenge the user device to return a current set of survey data before responding to every service request of a first security implication level and may challenge the user device to return a current set of survey data before responding to some service requests of a second security implication level.

In an embodiment, the user device provides a secure mode of execution, and at least part of the secure application API executes in this secure mode of execution. For example, the instructions of the secure application API for requesting a service of the secure application may execute solely in this secure mode of execution and may launch the instructions of the API related to capturing the survey data. For example, the instructions of the API related to capturing the survey data may execute solely in this secure mode of execution, whereby to prevent hacking and bypassing this security provision. In an embodiment, the user device may have a secure area of non-transitory memory where the API instructions involved in capturing the survey data are installed. This secure mode of execution and/or secure area of non-transitory memory may be provided by hardware features built into the processor(s) and non-transitory memory of the user device. Alternatively, this secure mode of execution and/or secure area of non-transitory memory may be provided by firmware or the operating system of the user device.

In an embodiment, the secure application manager may be a third-party application operated separately from specific secure applications and possibly relied upon by multiple different secure applications to provide the profile checks. For example, a retail application may embed the profile checking instructions in its API for user devices and a healthcare account management application may embed the same profile instructions in its API for user devices. In this instance, the profile checking functionality is provided as a service that may be relied upon by different distributed secure applications to reduce their exposure to cyber attacks and/or identity theft.

Users desirably are able to securely conduct sensitive and confidential operations on various secure applications via wireless communication using their user device (e.g., smart phone, IoT devices, laptop computer, etc.) without fear of having their money, their retirement savings, and/or confidential information stolen. The disclosed system for secure management of execution of secure applications provides an efficient, convenient, and flexible specific solution for this technical problem. By capturing surveys or profiles of user device configurations (e.g., firmware, operating system, secure application API installation configurations), validating these surveys or profiles against provisioned authoritative configuration information, storing these surveys in immutable records in a data store, challenging the user devices to capture and send the current profile of the user device, and comparing current profile information to stored profiles, the security of the communication and the user device can be confirmed.

In an embodiment, a trusted security zone of the user device provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. Pat. No. 9,282,898, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Turning now to FIG. 1, a system 100 is described. In an embodiment, the system 100 comprises an Internet of things (IoT) device 102 that comprises a wireless radio transceiver 104, a central processor unit (CPU) or processor 106, and a memory 108. The IoT device 102 may establish a wireless communication link with an access point (AP) 110, and the AP 110 may link the IoT device 102 to a network 112. The AP 110 may provide a WiFi or other short-range wireless link to the IoT device 102. The AP 110 may be a cell site and may provide a cellular wireless communication link according to a 5G, long-term evolution (LTE), code division multiple access (CDMA), or global system for mobile communications (GSM) telecommunication protocol. It is understood that the system 100 may comprise any number of APs 110. It is understood that the system 100 may comprise any number of IoT devices 102. In an embodiment, the role of the IoT device 102 is performed by a different user device type, for example by a smart phone, a laptop computer, a tablet computer, a notebook computer, a wearable computer, a headset computer, a desktop computer, a robot, or an in-vehicle computer.

The network 112 comprises one or more public networks, one or more private networks, or a combination thereof. The IoT device 102 may comprise firmware 124, an operating system (OS) 126 installed in a non-transitory portion of the memory 108. The firmware 124 and OS 126 may be installed by an original equipment manufacturer (OEM) of the IoT device 102 and may typically remain unaltered for extended periods of time, for example updated by an over-the-air update initiated occasionally by an OEM or an owner of the IoT device 102. It is understood that the OS 126 includes an operating system kernel. In an embodiment, the OS 126 may comprise additional software artifacts in addition to the kernel, for example device drivers, user interfaces, utilities, and other software that may be considered to execute on top of the kernel.

The IoT device 102 may desire to obtain services from a secure application 116 executing on a server computer 114. For example, a user of the IoT device 102 may send a request to a secure application manager 122 executing on a computer server 120 to initiate installation of an application programming interface (API) associated with the secure application 116 that may mediate requests for service from the secure application 116 for the user and/or the IoT device 102. In response to the request to initiate installation of the API, the secure application manager 122 may cause a secure application API 130 and a secure application API trustlet 132 to be installed in the non-transitory portion of the memory 108. In an embodiment, the secure application API trustlet 132 may be installed in a trusted security zone or other protected area of the non-transitory portion of the memory 108. In another embodiment (e.g., in an embodiment where the IoT device 102 or other user device type does not provide hardware or software support for trusted execution), only the secure application API 130 is installed in the non-transitory portion of the memory 108, and the functions attributed to the secure application API trustlet 132 are instead performed by the secure application API 130.

The secure application 116 may be any of a variety of applications that provide on-line services of a sensitive and/or confidential nature. The secure application 116 may be a banking application, a payment application, an investment management application, a retirement funds management application, a retail application, a healthcare management application, and other secure applications. In an embodiment, the secure application 116 and the secure application manager 122 may be owned and/or operated by the same enterprise and may execute on the same computer server or computer system. In another embodiment, the secure application manager 122 is owned and operated by a third-party that provides security services for a plurality of different enterprises, each of which may provide secure application services to IoT devices 102. In an embodiment, the secure application 116 may be a distributed secure application.

When the secure application API 130 and secure application API trustlet 132 are initially installed on the IoT device 102, the secure application API 130 and/or secure application API trustlet 132 surveys the hardware and software resources of the IoT device 102 and creates an initial profile of the IoT device 102 based on the information discovered by the survey. The initial profile can include an identity (e.g., serial number), a make, and a model of the IoT device 102, the version and/or release numbers of hardware devices in the IoT device 102, of the firmware 124, and of the OS 126. The initial profile can include the sizes and memory storage locations (e.g., memory addresses and/or ranges of memory addresses) of the firmware 124 and of the OS 126. The initial profile can include hashes of the OS 126, the secure application API 130, and the secure application API trustlet 132. The secure application API 130 and/or the secure application API trustlet 132 sends the initial profile to the secure application manager 122. The secure application manager 122 may store the initial profile in a data store 134, along with the initial profile of other IoT devices 102 that have likewise requested installation of the secure application API 130 and secure application API trustlet 132.

In an embodiment, the secure application manager 122 validates the authenticity of the received initial profile BEFORE storing the initial profile in the data store 134. Authenticating the initial profile can be done in a number of ways. Some portion of the information contained in the initial profile may be known to an original equipment manufacturer (OEM) of the IoT device 102. For example, the OEM may be able to provide authoritative information to the secure application manager on a range of individual identities (e.g., embedded identification document (EID), international mobile equipment identity (IMEI), mobile equipment identity (MEID), electronic serial number (ESN), or other uniquely identifying designation) associated with a specific model of IoT device 102. The OEM may be able to provide authoritative information on version numbers of firmware and/or operating system artifacts installed in IoT devices 102, for example hash values determined based on the firmware and/or operating system artifacts as well as one or more address ranges of where the firmware 124 and/or operating system 126 are installed in a non-transitory memory of the IoT devices 102. Likewise, enterprises that operate secure applications 116 and distribute secure application APIs 130 and/or secure application API trustlets 132 to IoT devices 102 may provide information on the initial configuration of these secure application APIs 130 and/or secure application API trustlets 132 to the secure application manager 122.

The OEM may be involved in sending updates of firmware and/or operating system artifacts to IoT devices 102 already in possession of users, and the OEM may be able to provide authoritative information to the secure application manager 122 on firmware updates and/or operating system updates. The authoritative information received from the OEM can be stored in the data store 134 as one or more immutable records. It is understood that the secure application manager 122 may receive such information from a plurality of OEMs and store this information in immutable records in the data store 134. Likewise, enterprises that provide information on the initial configuration of secure application APIs 130 and/or secure application API trustlets 132 may provide updated information on configurations of application APIs 130 and/or secure application API trustlets 132 to the secure application manager 122 as updates are deployed to IoT devices 102. It is understood that the secure application manager 122 may receive such information from a plurality of different enterprises associated with a plurality of different secure applications 116, for example one or more banking applications, one or more payment applications, one or more investment management applications, one or more retirement funds management applications, one or more retail applications, one or more healthcare management applications, and/or other secure applications.

Validating the authenticity of an initial profile received from the IoT device 102 involves comparing the received initial profile to the associated information provided by an OEM that made the subject IoT device 102 and to the information provided by one or more enterprises on the configurations of secure application APIs 130 and/or secure API trustlets 132. If the initial profile received from the device 102 does not compare closely to authoritative information provided by OEMs or by one or more enterprises, the initial profile is not stored by the secure application manager 122 in the data store 134. There may be some process that can be followed that resolves this problem. As OEMs deploy updated firmware 124 and/or updated OS 126, they may send updated authoritative information to the secure application manager 122 to be stored in the data store 134. When updated firmware 124 and/or OS 126 is installed on the IoT device 102, the IoT device 102 may send a new initial profile (e.g., an updated initial profile) to the secure application manger 122, the secure application manager 122 may validate the authenticity of this new initial profile, and, if validated, store the new initial profile in the data store 134.

From time to time, the secure application manager 122 may prompt the secure application API 130 and/or the secure application API trustlet 132 to provide an updated initial profile. This simply entails determining again the profile information and sending this to the secure application manager 122. The secure application manager 122 then replaces the existing initial profile stored in the data store 134 with the updated initial profile. The secure application manager 122 may request an updated initial profile if so requested by the owner of one or more IoT devices 102. For example, a home owner may have recently purchased a pre-existing house, has transferred ownership of the IoT devices 102 to himself or herself, and wants the initial profile associated with his or her IoT devices 102 updated in the data store 134. Alternatively, the home owner may have initiated an over-the-air update of OS 126 or other resources on the IoT device 102 and wants this to be reflected in an updated initial profile. The home owner may invoke a function of the secure application manager 122 to request an updated initial profile from some IoT devices 102 by presenting a secure token to the secure application manager 122.

The secure application manager 122 may prompt the secure application API 130 and/or secure application API trustlet 132 to provide an updated initial profile at other times of its own choosing or when prompted by an owner or operator of the secure application 116. The secure application manager 122 may prompt the secure application API 130 and/or the secure application API trustlet 132 to provide the updated initial profile periodically and at a time that the secure application manager 122 deems to present a low risk of cyber attack. For example, the secure application manager 122 may track a large number of IoT devices 102, and when there is very little evidence of the IoT devices 102 being hacked, the secure application manager 122 may progressively prompt the IoT devices 102 to provide updated initial profiles. The secure application manager 122 may also obtain a general cyber security environmental rating from a third-party security evaluation tool which may monitor cyber security across many enterprises and many communication infrastructures.

The secure application manager 122 may compare an updated initial profile of an IoT device 102 to the initial profile associated with the IoT device 102 in the data store 134. If the updated initial profile is too different from the initial profile, the secure application manager 122 may abort the updating of the initial profile in the data store 134.

When the IoT device 102 requests a service from the secure application 116 via the secure application API 130, the request may be routed to the secure application manager 122. The secure application manager 122, before forwarding the request to the secure application 116 for fulfillment, may challenge the secure application API trustlet 132 to complete a new survey of the IoT device 102 hardware, the firmware 124, the OS 126 and send the current profile of these resources to the secure application manager 122. The secure application manager 122 may compare the current profile of the IoT device 102 with the initial or updated profile of the same IoT device 102 stored in the data store 134. If the current profile and the initial or updated profile match, the secure application manager 122 may forward the service request on to the secure application 116.

If the current profile and the initial or updated profile do not match, the secure application manager 122 may drop the service request and possibly report the event to an owner of the secure application 116. When the current profile and the initial or updated profile associated with the IoT device 102 do not match—or do not match within predefined bounds of variation—it may be supposed that the IoT device 102 may have been hacked or corrupted. In an embodiment, when the secure application manager 122 rejects a service request from the IoT device 102, it may send a notification to the IoT device 102 and/or to an owner of record of the IoT device 102 indicating the reason for rejection of the service request.

In response, the owner of the IoT device 102 may contact the secure application service provider and/or the secure application manager 122 to present justification for the difference between the current profile and the initial profile. If the justification is accepted, the secure application manager 122 may command the secure application API 130 and/or the secure application trustlet 132 to survey the hardware resources, the firmware 124, and the OS 126 again and to send an updated initial profile to the secure application manager 122. In response to receiving the updated initial profile, the secure application manager 122 may replace the initial profile associated with the IoT device 102 with the updated initial profile associated with the IoT device 102. In an embodiment, an owner of record of the IoT device 102 may initiate generation of an updated initial profile for one or more IoT devices 102, for example on the event of completing an over-the-air update of one or more IoT devices 102. In an embodiment, an owner or operator of the secure application 116 may initiate prompting the IoT device 102 to provide an updated initial profile, for example after the secure application 116 has completed an over-the-air update of the secure application API 130 and/or secure application API trustlet 132 on the IoT device 102.

The secure application manager 122 may challenge the secure application API trustlet 132 to provide a current profile in response to every request by the secure application API 130 and/or by the secure application API trustlet 132 for service from the secure application 116. Alternatively, the secure application manager 122 may challenge the secure application API trustlet 132 to provide a current profile after every N-number of services requests and/or after a predefined interval of time. In an embodiment, the secure application manager 122 may differentiate between different tiers of confidentiality associated with different service requests (e.g., different kinds of requests for service from the secure application 116 may invoke more or less sensitive or confidential functions of the secure application 116) from the secure application API 130 and/or the secure application API trustlet 132 and may subject the most sensitive service requests to a challenge to provide a current profile for every service request while less sensitive service requests are not subjected to a challenge before forwarding every service request to the secure application 116.

In an embodiment, the secure application manager 122 may interoperate with different secure applications 116. For example, a first server computer 114 may execute a first secure application 116, and a second server computer 114 may execute a second secure application 116. The first secure application 116 may be a banking application, while the second secure application 116 may be a healthcare portal for patients of a healthcare provider. The secure application manager 122 may be operated by an independent third-party to provide security for such secure applications 116.

In an embodiment, the secure application manager 122 stores one or more initial profiles as an immutable record in the data store 134. The immutable records may be in the form of a block in a hyperledger data structure or in a blockchain data structure. The hyperledger data structure may comprise a plurality of blocks, where each block comprises a hash of the block immediately preceding the subject block, a nonce value, the data to be stored (e.g., one or more initial profiles and/or updated initial profiles), and a hash over the subject block. The hash over the subject block may be found over the previous hash value, over the nonce, and over the data. The nonce may be selected during building the subject block such that the hash over the subject block satisfies some condition, such as that the four most significant digits of the hash are all zero values. The blocks of a blockchain may be structured similarly. It is thought that such data structures are immutable in that if a block is mutated—is corrupted by a malefactor—the hash values of the blocks become inconsistent and hence such tampering is readily detectable.

The secure application API trustlet 132 may execute in a trusted security zone provided by the CPU 106 or provided by a feature of the OS 126. When the CPU 106 executes the secure application API trustlet 132, it halts parallel processing that may be otherwise on-going on the CPU 106 and halts interleaving (time sharing) of the CPU 106 while the secure application API trustlet 132 is in the middle of completing an operation. In this way, other applications or processes cannot spy on the operations of the secure application API trustlet 132 or insinuate a corrupting behavior to the determination of the initial profile or an updated initial profile of the IoT device 102. While the discussion with reference to FIG. 1 above has been directed to securing access of an IoT device 102 to services offered by the secure application 116, it is understood that this security framework may equally be applied for use by user equipment such as smart phones, personal digital assistants (PDAs), laptop computers, desktop computers, notebook computers, tablet computers, wearable computers, robots, in-vehicle computers, and other like computing devices.

Figure 2A:
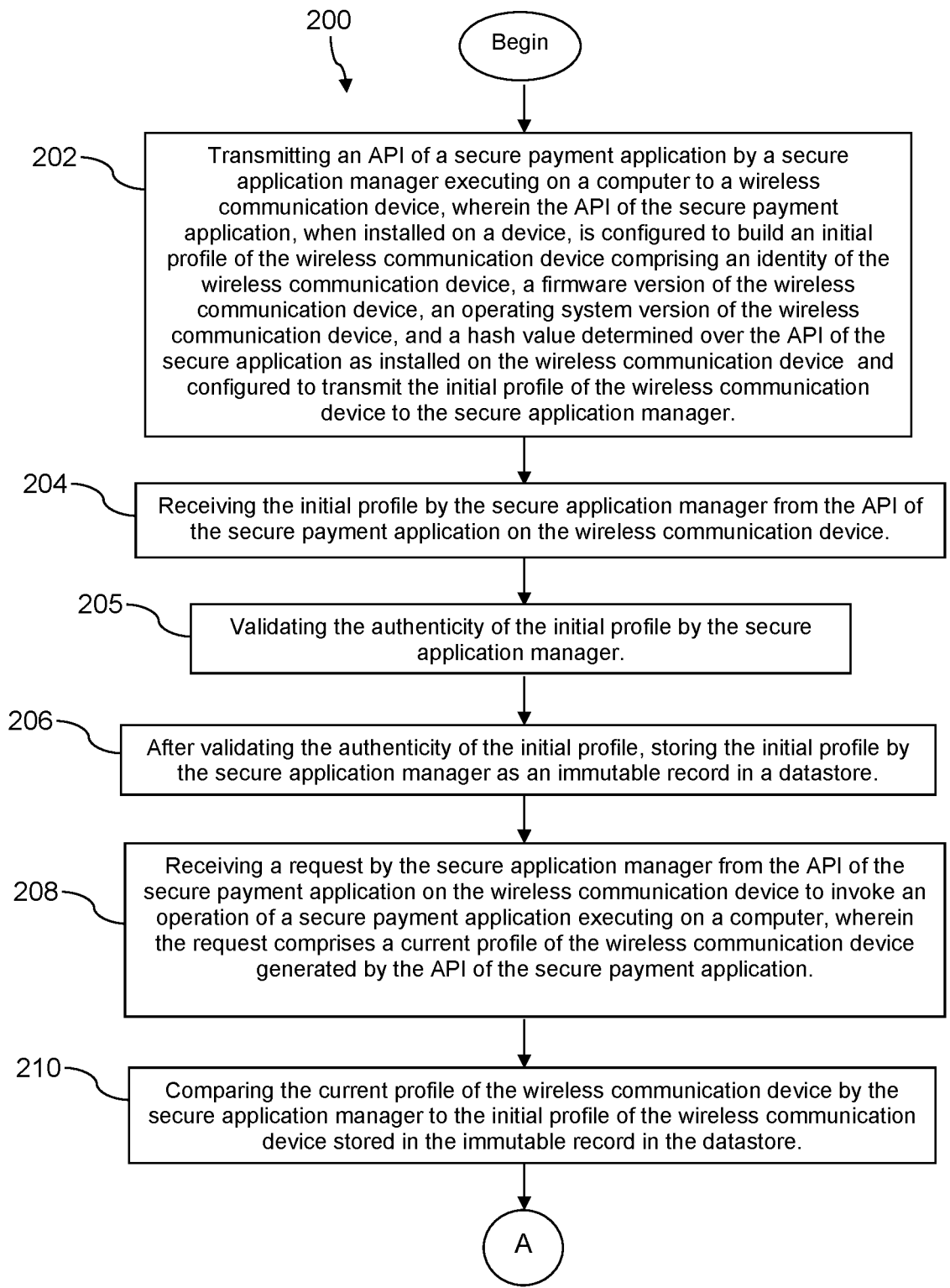
FIG. 2A and FIG. 2B are a flow chart of a method according to an embodiment of the disclosure.
Figure 2B:
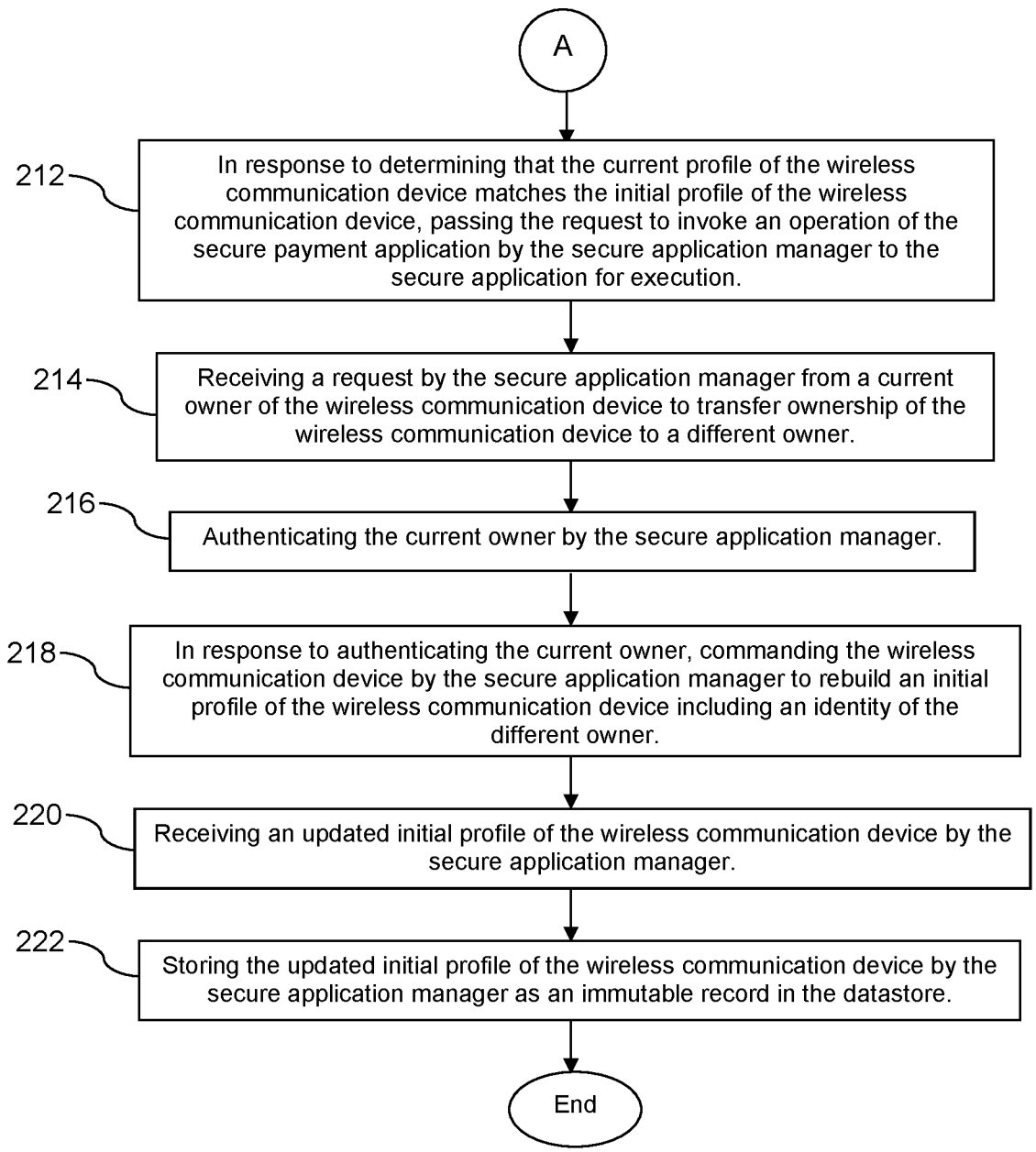

Turning now to FIG. 2A and FIG. 2B, a method 200 is described. In an embodiment, the method 200 is a method of managing execution of a secure payment application. At block 202, the method 200 comprises transmitting an API of a secure payment application by a secure application manager executing on a computer to a wireless communication device, wherein the API of the secure payment application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager.

At block 204, the method 200 comprises receiving the initial profile by the secure application manager from the API of the secure payment application on the wireless communication device. At block 205, the method 200 comprises validating the authenticity of the initial profile by the secure application manager. Authenticating the initial profile can be done in a number of ways. Some portion of the information contained in the initial profile may be known to an original equipment manufacturer (OEM) of the wireless communication device. For example, the OEM may be able to provide authoritative information to the secure application manager on a range of individual identities (e.g., embedded identification document (EID), international mobile equipment identity (IMEI), mobile equipment identity (MEID), electronic serial number (ESN), or other uniquely identifying designation) associated with a specific model of wireless device. The OEM may be able to provide authoritative information on version numbers of firmware and/or operating system artifacts installed in wireless devices, for example hash values determined based on the firmware and/or operating system artifacts as well as one or more address ranges of where the firmware and/or operating system artifacts are installed in a non-transitory memory of the wireless devices. Likewise, enterprises that operate secure applications and distribute secure application APIs and/or secure application API trustlets to wireless devices may provide information on the initial configuration of these secure application APIs and/or secure API trustlets to the secure application manager.

The OEM may be involved in sending updates of firmware and/or operating system artifacts to wireless devices already in possession of users, and the OEM may be able to provide authoritative information to the secure application manager on firmware updates and/or operating system artifacts updates. The authoritative information received from the OEM can be stored in the datastore as one or more immutable records. It is understood that the secure application manager may receive such information from a plurality of OEMs and store this information in immutable records in the datastore. Likewise, enterprises that provide information on the initial configuration of secure application APIs and/or secure API trustlets may provide updated information on configurations of application APIs and/or secure API trustlets to the secure application manage as updates are deployed to wireless devices. It is understood that the secure application manager may receive such information from a plurality of different enterprises associated with a plurality of different secure applications, for example one or more banking applications, one or more payment applications, one or more investment management applications, one or more retirement funds management applications, one or more retail applications, one or more healthcare management applications, and/or other secure applications.

Validating the authenticity of an initial profile received from a wireless device involves comparing the received initial profile to the associated information provided by an OEM that made the subject wireless device and to the information provided by one or more enterprises on the configurations of secure application APIs and/or secure API trustlets. If the initial profile received from a wireless device does not compare closely to authoritative information provided by OEMs or by one or more enterprises, the initial profile is not stored by the secure application manager and the processing of method 200 exits. There may be some process that can be followed that resolves this problem, in which case the method 200 may restart at block 202 or at block 204.

At block 206, the method 200 comprises, after validating the authenticity of the initial profile, storing the initial profile by the secure application manager as an immutable record in a datastore. At block 208, the method 200 comprises receiving a request by the secure application manager from the API of the secure payment application on the wireless communication device to invoke an operation of a secure payment application executing on a computer, wherein the request comprises a current profile of the wireless communication device generated by a portion of the API of the secure payment application executing in a trusted area of the wireless communication device. At block 210, the method 200 comprises comparing the current profile of the wireless communication device by the secure application manager to the initial profile of the wireless communication device stored in the immutable record in the datastore.

At block 212, the method 200 comprises, in response to determining that the current profile of the wireless communication device matches the initial profile of the wireless communication device, passing the request to invoke an operation of the secure payment application by the secure application manager to the secure application for execution. At block 214, the method 200 comprises receiving a request by the secure application manager from a current owner of the wireless communication device to transfer ownership of the wireless communication device to a different owner.

At block 216, the method 200 comprises authenticating the current owner by the secure application manager. At block 218, the method comprises, in response to authenticating the current owner, commanding the wireless communication device by the secure application manager to rebuild an initial profile of the wireless communication device including an identity of the different owner.

At block 220, the method 200 comprises receiving an updated initial profile of the wireless communication device by the secure application manager. At block 222, the method 200 comprises storing the updated initial profile of the wireless communication device by the secure application manager as an immutable record in the datastore.

Figure 3:
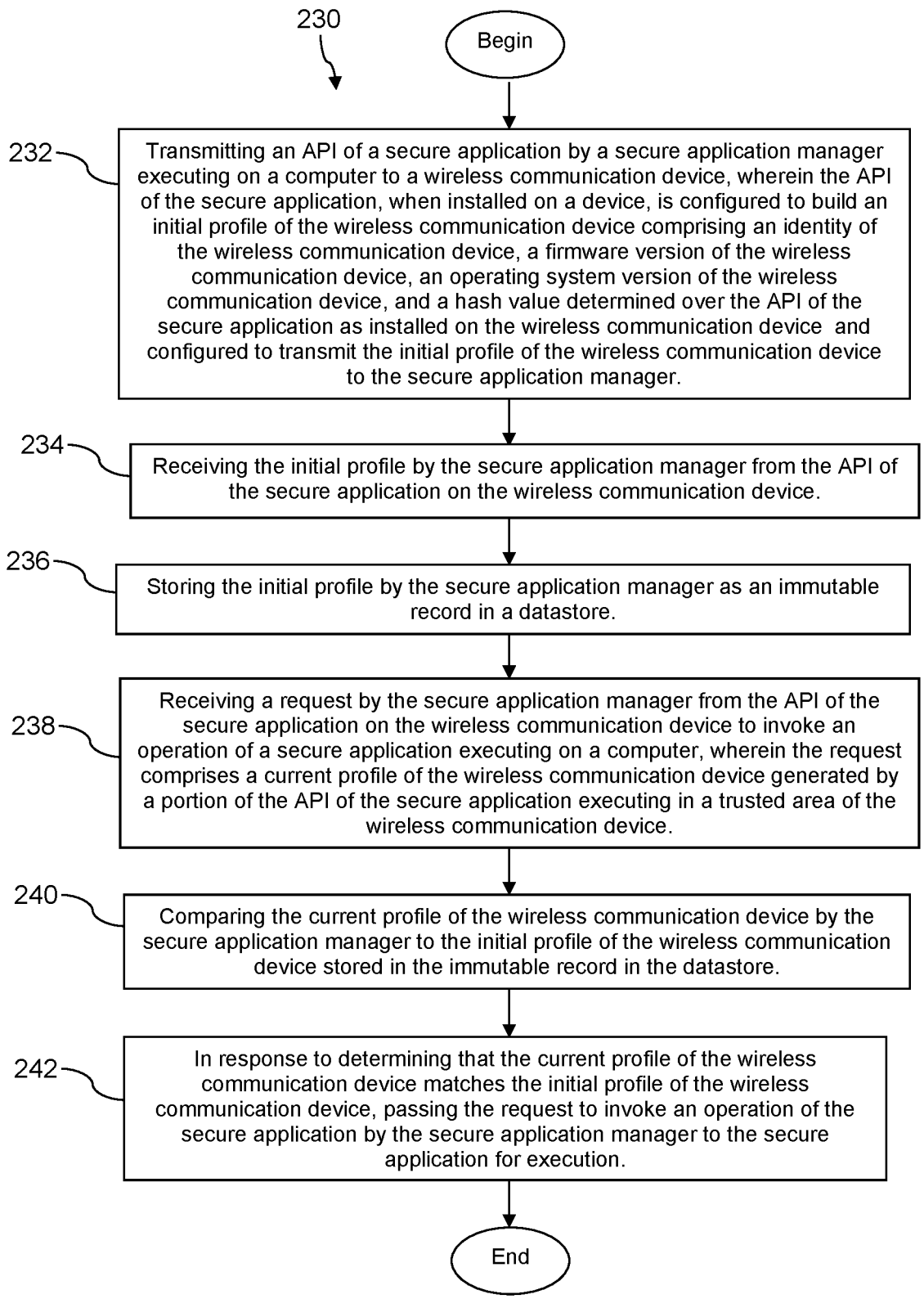
FIG. 3 is a flow chart of another method according to an embodiment of the disclosure.

Turning now to FIG. 3, a method 230 is described. In an embodiment, method 230 is a method of managing execution of a secure application. At block 232, the method 230 comprises transmitting an API of a secure application by a secure application manager executing on a computer to a wireless communication device, wherein the API of the secure application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager.

At block 234, the method 230 comprises receiving the initial profile by the secure application manager from the API of the secure application on the wireless communication device. At block 236, the method 230 comprises storing the initial profile by the secure application manager as an immutable record in a datastore.

At block 238, the method 230 comprises receiving a request by the secure application manager from the API of the secure application on the wireless communication device to invoke an operation of a secure application executing on a computer, wherein the request comprises a current profile of the wireless communication device generated by a portion of the API of the secure application executing in a trusted area of the wireless communication device. At block 240, the method 230 comprises comparing the current profile of the wireless communication device by the secure application manager to the initial profile of the wireless communication device stored in the immutable record in the datastore.

At block 242, the method 230 comprises, in response to determining that the current profile of the wireless communication device matches the initial profile of the wireless communication device, passing the request to invoke an operation of the secure application by the secure application manager to the secure application for execution.

Figure 4:
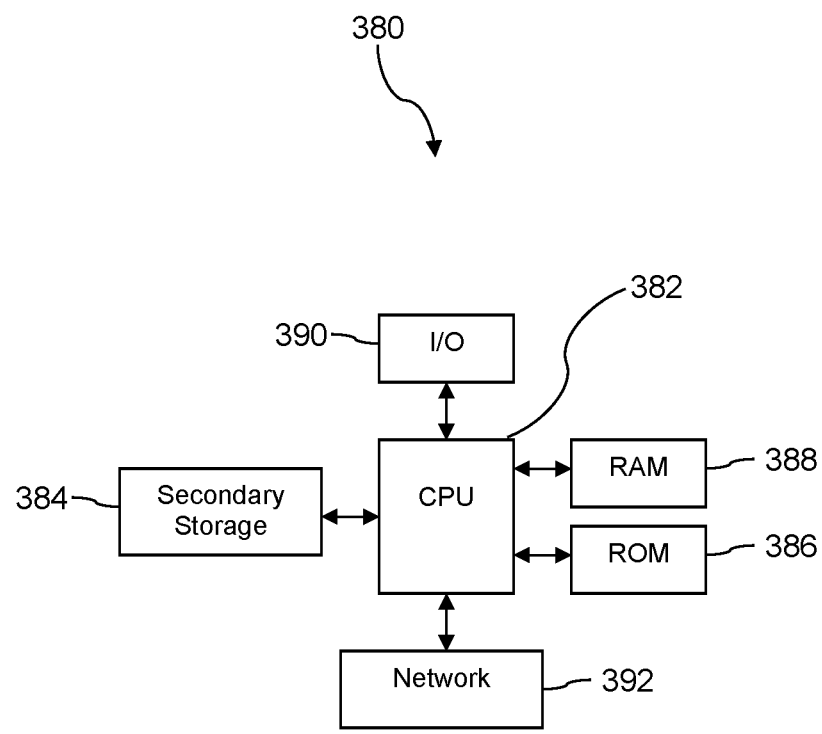
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing execution of a secure payment application, comprising:
    transmitting an API of a secure payment application by a secure application manager executing on a computer to a wireless communication device, wherein the API of the secure payment application, when installed on a device, is configured to build an initial profile of the wireless communication device comprising an identity of the wireless communication device, a firmware version of the wireless communication device, an operating system version of the wireless communication device, and a hash value determined over the API of the secure payment application as installed on the wireless communication device and configured to transmit the initial profile of the wireless communication device to the secure application manager;
    receiving the initial profile by the secure application manager from the API of the secure payment application on the wireless communication device;
    validating the authenticity of the initial profile by the secure application manager;
    after validating the authenticity of the initial profile, storing the initial profile by the secure application manager as an immutable record in a datastore;
    receiving a request by the secure application manager from the API of the secure payment application on the wireless communication device to invoke an operation of a secure payment application executing on a computer, wherein the request comprises a current profile of the wireless communication device generated by the API of the secure payment application;
    comparing the current profile of the wireless communication device by the secure application manager to the initial profile of the wireless communication device stored in the immutable record in the datastore;
    in response to determining that the current profile of the wireless communication device matches the initial profile of the wireless communication device, passing the request to invoke an operation of the secure payment application by the secure application manager to the secure payment application for execution;
    receiving a request by the secure application manager from a current owner of the wireless communication device to transfer ownership of the wireless communication device to a different owner;
    authenticating the current owner by the secure application manager;
    in response to authenticating the current owner, commanding the wireless communication device by the secure application manager to rebuild an initial profile of the wireless communication device including an identity of the different owner;
    receiving an updated initial profile of the wireless communication device by the secure application manager; and
    storing the updated initial profile of the wireless communication device by the secure application manager as an immutable record in the datastore.

2. The method of claim 1, wherein the wireless communication device is an Internet of things (IoT) device.

3. The method of claim 1, wherein the wireless communication device is one of a smart phone, a mobile phone, a laptop computer, a desktop computer, a tablet computer, a notebook computer, a wearable computer, a robot, or an in-vehicle computer.

4. The method of claim 1, wherein the API of the secure payment application comprises a secure application API portion that executes on the wireless communication device normally and a secure application API trustlet that executes in a trusted mode supported by the wireless communication device and wherein the secure application API trustlet builds the initial profile of the wireless communication device and transmits the initial profile to the secure application manager.

5. The method of claim 1, wherein the wireless communication device communicates via WiFi.

6. The method of claim 1, wherein the wireless communication device communicates via one of a 5G, a long-term evolution (LTE), a code division multiple access (CDMA), or a global system for mobile communications (GSM) telecommunication protocol.

7. A secure application management system, comprising:
    an at least one processor;
    a non-transitory memory;
    a datastore;
    a secure application stored in the non-transitory memory that, when executed by the at least one processor, executes requests from application programming interfaces (APIs) of the secure application installed on a plurality of wireless communication devices; and
    a secure application manager stored in the non-transitory memory that, when executed by the at least one processor:

transmits the API of the secure application to a wireless communication device, wherein the API of the secure application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager, receives the initial profile from the API of the secure application on the wireless communication device, stores the initial profile as an immutable record in the datastore, receives a request from the API of the secure application on the wireless communication device to invoke an operation of the secure application, wherein the request comprises a current profile of the wireless communication device generated by a portion of the API of the secure application executing in a trusted area of the wireless communication device, compares the current profile of the wireless communication device to the initial profile of the wireless communication device stored in the immutable record in the datastore, and in response to determining that the current profile of the wireless communication device matches the initial profile of the wireless communication device, passes the request to invoke an operation of the secure application to the secure application for execution.

8. The secure application management system of claim 7, wherein the identity of the wireless communication device comprises a serial number of the wireless communication device.

9. The secure application management system of claim 8, wherein the identity of the wireless communication device comprises a make and model of the wireless communication device.

10. The secure application management system of claim 7, wherein the initial profile comprises one or more address ranges where an operating system is stored in the non-transitory memory.

11. The secure application management system of claim 7, wherein the secure application manager further sends a command to the API of the secure application stored on the wireless communication device to send an updated initial profile; receives the updated initial profile; and stores the updated initial profile as the initial profile associated with the wireless communication as an immutable record in the datastore.

12. The secure application management system of claim 11, wherein the secure application manager sends the command to the API of the secure application to send an updated initial profile periodically.

13. The secure application management system of claim 7, wherein the secure application manager performs the comparison of the current profile to the initial profile for some requests to invoke an operation of the secure application and does not perform the comparison of the current profile to the initial profile for other requests to invoke an operation of the secure application.

14. The secure application management system of claim 13, wherein the secure application manager performs the comparison of the current profile to the initial profile for one out of every N-number of requests to invoke an operation of the secure application.

15. The secure application management system of claim 13, wherein the secure application manager performs the comparison of the current profile to the initial profile for every request to invoke a highly sensitive operation of the secure application and wherein the secure application manager performs the comparison of the current profile to the initial profile for one out of every N-number of requests to invoke less sensitivity operations of the secure application.

16. A method of managing execution of a secure application, comprising:

transmitting an API of a secure application by a secure application manager executing on a computer to a wireless communication device, wherein the API of the secure application, when installed on a device, is configured to build an initial profile of the wireless communication device comprising an identity of the wireless communication device, a firmware version of the wireless communication device, an operating system version of the wireless communication device, and a hash value determined over the API of the secure application as installed on the wireless communication device and configured to transmit the initial profile of the wireless communication device to the secure application manager;

receiving the initial profile by the secure application manager from the API of the secure application on the wireless communication device;

storing the initial profile by the secure application manager as an immutable record in a datastore;

receiving a request by the secure application manager from the API of the secure application on the wireless communication device to invoke an operation of a secure application executing on a computer, wherein the request comprises a current profile of the wireless communication device generated by a portion of the API of the secure application executing in a trusted area of the wireless communication device;

comparing the current profile of the wireless communication device by the secure application manager to the initial profile of the wireless communication device stored in the immutable record in the datastore; and in response to determining that the current profile of the wireless communication device matches the initial profile of the wireless communication device, passing the request to invoke an operation of the secure application by the secure application manager to the secure application for execution.

17. The method of claim 16, wherein the secure application is one of a banking secure application, a payment secure application, a retirement funds management secure application, an investment management secure application, and a healthcare management secure application.

18. The method of claim 16, wherein a plurality of APIs of secure applications are installed on the wireless communication device.

19. The method of claim 16, wherein the wireless communication device is an Internet of things (IoT) device.

20. The method of claim 16, wherein the wireless communication device is one of a smart phone, a mobile phone, a personal digital assistant (PDA), a wearable computer, a desktop computer, a laptop computer, a tablet computer, a notebook computer, a robot, or an in-vehicle computer.

* * * * *